(12) United States Patent
Yu et al.

(10) Patent No.: US 8,897,164 B2
(45) Date of Patent: Nov. 25, 2014

(54) DATA TRANSMISSION METHOD, BASE STATION, AND COMMUNICATION SYSTEM

(75) Inventors: Zheng Yu, Beijing (CN); Lixia Xue, Beijing (CN); Xiao'an Fan, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 13/593,958

(22) Filed: Aug. 24, 2012

(65) Prior Publication Data

US 2012/0327886 A1    Dec. 27, 2012

Related U.S. Application Data

(63) Continuation of application No. PCT/CN2011/071288, filed on Feb. 25, 2011.

(30) Foreign Application Priority Data

Feb. 25, 2010    (CN) .......................... 2010 1 0117174

(51) Int. Cl.
  *H04L 12/28*     (2006.01)
  *H04W 4/00*      (2009.01)
  *H04B 7/216*     (2006.01)
  *H04W 72/04*     (2009.01)
  *H04L 5/00*      (2006.01)
  *H04L 27/26*     (2006.01)
  *H04W 72/12*     (2009.01)

(52) U.S. Cl.
  CPC ............ *H04W 72/04* (2013.01); *H04W 72/042* (2013.01); *H04L 5/0051* (2013.01); *H04L 27/2613* (2013.01); *H04W 72/1268* (2013.01)
  USPC ............ 370/252; 370/328; 370/329; 370/335

(58) Field of Classification Search
  USPC ......... 370/329, 280, 328, 336, 252, 315, 335, 370/210, 330, 331, 350, 474; 375/340, 224, 375/260, 267; 455/450, 272, 422.1, 434, 455/452.2, 67.13
  See application file for complete search history.

(56) References Cited

U.S. PATENT DOCUMENTS 7,830,837 B2 *  11/2010  Park et al. ...................... 370/329
8,245,092 B2 *   8/2012  Kotecha et al. ............... 714/748
(Continued)

FOREIGN PATENT DOCUMENTS

CN    101309134        11/2008
CN    101309134 A      11/2008
(Continued)

OTHER PUBLICATIONS

3GPP, LTE: Evolved Universal Terrestrial Radio Access (E-UTRA) Physical Channels and Modulation Release 8, Jun. 2009, ETSI; Version 8.7.0; p. 22-34, 62-64.*

(Continued)

*Primary Examiner* — Benjamin H Elliott, IV
*Assistant Examiner* — Eric Nowlin
(74) *Attorney, Agent, or Firm* — Staas & Halsey LLP (57) ABSTRACT

The present invention discloses a data transmission method, a base station, and a communication system, which are applied in the communication field. The method includes: determining to perform semi-persistent scheduling on data of a user equipment; setting a value of first information for the user equipment, so that the user equipment determines a cyclic shift value of a reference signal sequence of the user equipment according to the value of the first information; and obtaining the reference signal sequence of the user equipment, performing channel estimation according to the reference signal sequence of the user equipment, and performing demodulation on data information of the user equipment according to a channel coefficient obtained by performing the channel estimation.

12 Claims, 3 Drawing Sheets

(56) References Cited

U.S. PATENT DOCUMENTS

| | | | |
|---|---|---|---|
| 8,380,213 B2* | 2/2013 | Cai et al. | 455/450 |
| 2008/0025264 A1* | 1/2008 | Willenegger et al. | 370/333 |
| 2008/0075195 A1 | 3/2008 | Pajukoski et al. | |
| 2008/0298433 A1* | 12/2008 | Tiirola et al. | 375/132 |
| 2009/0103500 A1* | 4/2009 | Malkamaki et al. | 370/336 |
| 2009/0213769 A1 | 8/2009 | Shen et al. | |
| 2009/0268685 A1 | 10/2009 | Chen et al. | |
| 2010/0067591 A1* | 3/2010 | Luo et al. | 375/260 |
| 2010/0172290 A1* | 7/2010 | Nam et al. | 370/328 |
| 2011/0170495 A1* | 7/2011 | Earnshaw et al. | 370/329 |

FOREIGN PATENT DOCUMENTS

| | | |
|---|---|---|
| CN | 101335550 | 12/2008 |
| WO | 2008/038114 | 4/2008 |
| WO | 2009/086668 | 7/2009 |
| WO | 2009/105750 | 8/2009 |

OTHER PUBLICATIONS

Chinese Office Action mailed Mar. 15, 2013 for corresponding Chinese Application No. 201010117174.8.

Written Opinion of the International Searching Authority issued Jun. 2, 2011 in corresponding International Patent Application No. PCT/CN2011/071288.

International Search Report issued Jun. 2, 2011 in corresponding International Patent Application No. PCT/CN2011/071288.

International Search Report, mailed Jun. 2, 2011, in corresponding International Application No. PCT/CN2011/071288 (4 pp.).

*CM issues for UL carrier aggregation,* 3GPP TSG RAN WG1 meeting #58bis, R1-093839, Miyazaki, Japan, Oct. 12-16, 2009 (5 pp.).

*PHICH carrier linkage for carrier aggregation,* 3GPP TSG-RAN WG1 Meeting #58bis, R1-093861, Miyazaki, Japan, Oct. 12-16, 2009 (7 pp.).

$3^{rd}$ *Generation Partnership Project; Technical Specification Group Radio Access Network; Evolved Universal Terrestrial Radio Access (E-UTRA); Physical Channels and Modulation* (Release 9), 3GPP TS 36.211 V9.0.0, Dec. 2009, pp. 1-85.

$3^{rd}$ *Generation Partnership Project; Technical Specification Group Radio Access Network; Evolved Universal Terrestrial Radio Access (E-UTRA); Physical layer procedures* (Release 9), 3GPP TS 36.213 V9.0.1, Dec. 2009, pp. 1-881.

$3^{rd}$ *Generation Partnership Project; Technical Specification Group Radio Access Network; Evolved Universal Terrestrial Radio Access (E-UTRA); Radio Resource Control (RRC) Protocol specification* (Release 9), 3GPP TS 36.331 V9.1.0, Dec. 2009, pp. 1-233.

Liu, Y., *Research on the Density of Demodulation Reference Signals for Dual-Layer Beamforming in LTE System,* Proceedings of ICCTA2009, pp. 322-325.

*OCC and CS for UL RS in SU/MU-MIMO,* 3GPP TSG RAN WG1 Meeting #59bis, R1-100378, Jan. 18-22, 2010, pp. 1-6.

*Considerations on Uplink DM-RS sequence in LTE-Advanced,* 3GPP TSG RAN WG1 Meeting #59bis, R1-100668, Jan. 18-22, 2010, pp. 1-6.

*DM-RS in Support of UL Spatial Multiplexing,* 3GPP TSG-RAN WG1 #59bis, R1-100691, Jan. 18-22, 2010, pp. 1-4.

*Considerations of PHICH mapping in LTE-A,* 3GPP TSG RAN WG1 Meeting #60, R1-101046, Feb. 22-26, 2010 (5 pp.).

*Uplink DM-RS Resource Assignment for LTE-Advanced,* 3GPP TSG RAN WG1 Meeting #60, R1-101223, Feb. 22-26, 2010, pp. 1-7.

*Consideration of DM-RS design for UL MIMO in LTE-A,* 3GPP TSG RAN WG1 Meeting #59bis, R1-101246, Feb. 22-26, 2010, pp. 1-5.

*CM reduction for UL RS on multiple component carriers,* 3GPP TSG RAN WG1 Meeting #60, R1-101268, Feb. 22-26, 2010, pp. 1-2.

Extended European Search Report, dated Jan. 24, 2013, in corresponding European Application No. 11746853.8 (15 pp.).

* cited by examiner

DATA TRANSMISSION METHOD, BASE STATION, AND COMMUNICATION SYSTEM

CROSS-REFERENCE TO RELATED APPLICATIONS

This application is a continuation of International Application No. PCT/CN2011/071288, filed on Feb. 25, 2011, which claims priority to Chinese Patent Application No. 201010117174.8, filed on Feb. 25, 2010, both of which are hereby incorporated by reference in their entireties.

FIELD OF THE INVENTION

The present invention relates to communications technologies, and in particular, to a data transmission technology.

BACKGROUND OF THE INVENTION

A base station in a communication system may perform channel estimation for a physical uplink data channel by using a DMRS (demodulation reference signal, demodulation reference signal) sequence sent by a UE (User Equipment, user equipment). The base station performs demodulation on data information carried on the physical uplink data channel by using a channel coefficient that is estimated by using the DMRS. The demodulation reference signal transmitted by the user equipment is a sequence known to both the base station and the user equipment. In addition, a UE served by the base station needs to transmit a demodulation reference signal when uplink data is transmitted. Demodulation reference signals transmitted by different UEs are orthogonal. Orthogonality of the demodulation reference signals transmitted by different UEs may be implemented by manners of frequency division multiplexing, time division multiplexing, code division multiplexing, or different cyclic shifts.

A manner of semi-persistent scheduling may be adopted for uplink data scheduling or downlink data scheduling in the communication system.

In the prior art, when uplink data transmission is performed by adopting the semi-persistent scheduling manner, different user equipments cannot perform data transmission on a same time and frequency resource, which reduces spectrum utilization efficiency.

SUMMARY OF THE INVENTION

By providing a data transmission method, a base station, and a communication system, when uplink data transmission is performed by adopting a semi-persistent scheduling manner, a problem that different user equipments cannot perform data transmission on a same time and frequency resource, which reduces spectrum utilization efficiency, can be solved.

In one aspect, a data transmission method is provided, where the method includes:

determining to perform semi-persistent scheduling on data of a user equipment;

setting a value of first information for the user equipment, so that the user equipment determines a cyclic shift value of a reference signal sequence of the user equipment according to the value of the first information; and obtaining the reference signal sequence of the user equipment, performing channel estimation according to the reference signal sequence of the user equipment, and performing demodulation on data information of the user equipment according to a channel coefficient obtained through the channel estimation.

a determining module, configured to determine to perform semi-persistent scheduling on data of a user equipment;

a setting module, configured to set a value of first information for the user equipment, so that the user equipment determines a cyclic shift value of a reference signal sequence of the user equipment according to the value of the first information; and an obtaining and demodulating module, configured to obtain the reference signal sequence of the user equipment, perform channel estimation according to the reference signal sequence of the user equipment, and perform demodulation on data information of the user equipment according to a channel coefficient obtained by performing the channel estimation.

Further, in another aspect, a communication system is provided, where the system includes: a base station, and a user equipment that is connected to the base station in a communicative manner.

The base station is configured to: determine to perform semi-persistent scheduling on data of a user equipment;

set a value of first information for the user equipment, so that the user equipment determines a cyclic shift value of a reference signal sequence of the user equipment according to the value of the first information; and obtain the reference signal sequence of the user equipment, perform channel estimation according to the reference signal sequence of the user equipment, and perform demodulation on data information of the user equipment according to a channel coefficient obtained by performing the channel estimation.

Through the foregoing data transmission method, base station, and communication system, when the uplink data transmission is performed by adopting the semi-persistent scheduling manner, different user equipments can perform the data transmission on the same time and frequency resource, which improves the spectrum utilization efficiency.

DETAILED DESCRIPTION OF THE EMBODIMENTS

An LTE (Long term evolution, long term evolution) system is taken as an example below to explain the embodiments of the present invention in detail.

Figure 1:
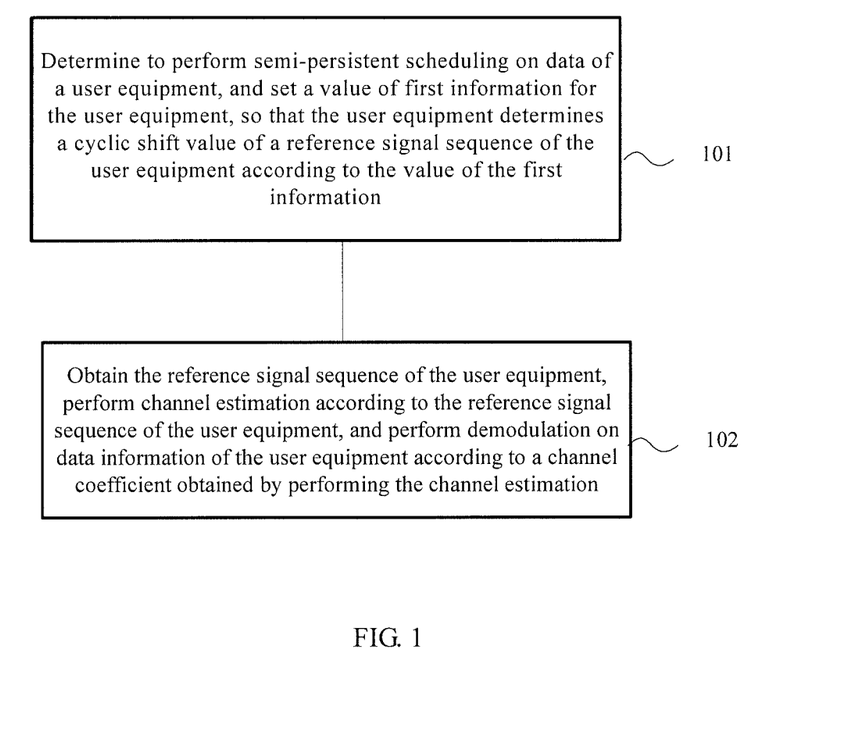
FIG. 1 is a flowchart of a data transmission method according to an embodiment of the present invention.

With reference to FIG. 1, a data transmission method according to an embodiment of the present invention is described in detail below. As shown in FIG. 1, the method may be as follows.

Step 101: Determine to perform semi-persistent scheduling on data of a user equipment, and set a value of first information for the user equipment, so that the user equipment determines a cyclic shift value of a reference signal sequence of the user equipment according to the value of the first information.

Step 102: Obtain the reference signal sequence of the user equipment, perform channel estimation according to the reference signal sequence of the user equipment, and perform demodulation on data information of the user equipment according to a channel coefficient obtained by performing the channel estimation.

According to the method provided in the foregoing embodiment, when uplink data transmission is performed by adopting a semi-persistent scheduling manner, different user equipments can perform data transmission on a same time and frequency resource, which improves spectrum utilization efficiency.

In the LTE system, the user equipment sends a Zadoff-Chu sequence to a base station. A cyclic shift value of the Zadoff-Chu sequence of the user equipment is determined by three parameters, which are $n_{DMRS}^{(1)}$, $n_{DMRS}^{(2)}$, and $n_{PRS}(n_s)$. $n_{DMRS}^{(1)}$ and $n_{PRS}(n_s)$ are cell-specific parameters, and their specific values are set by upper-layer signaling of the system. $n_{DMRS}^{(2)}$ is a user equipment-specific (UE-specific) parameter, and its specific value is indicated by an n-DMRS field (a cyclic shift indicator field of a demodulation reference signal) on a PDCCH (Physical downlink control channel, physical downlink control channel) for uplink data scheduling. If different UEs perform uplink data transmission on a same uplink time and frequency resource, uplink reference signal sequences of the UEs need to have different cyclic shift values. That is, values of the $n_{DMRS}^{(2)}$ of the UEs need to be mutually different.

When data transmission is performed by adopting the semi-persistent scheduling manner, the base station uses the PDCCH for the semi-persistent scheduling to perform resource scheduling for an initial data transmission block of the UE; the UE transmits a data transmission block according to a period configured by the upper-layer signaling of the system, and the UE considers by default that a time and frequency resource occupied by a non-initial data transmission block is the same as a time and frequency resource occupied by the initial data transmission block. In the LTE system, a value of a 3-bit n-DMRS field on the PDCCH for the semi-persistent scheduling is set to 000 fixedly.

In the LTE system, the base station needs to determine, according to an index of a first start physical resource block occupied by an uplink data transmission block of the UE and the n-DMRS bit field, an index of a physical hybrid-ARQ indicator channel (PHICH channel) corresponding to the foregoing data transmission block. The PHICH channel carries response information about whether the data transmission block transmitted by the UE to the base station is correctly received by the base station. If the base station correctly receives the data transmission block sent by the UE, the base station feeds back an ACK through the PHICH channel to the UE; otherwise, if the base station does not correctly receive the data transmission block sent by the UE, the base station feeds back a NACK through the PHICH channel to the UE. After the UE receives NACK information, if transmission of the foregoing data transmission block does not reach the maximum number of times of retransmission, where the maximum number of times of retransmission is allowed in the system, the UE retransmits the foregoing data transmission block.

When the data transmission is performed by using the semi-persistent scheduling manner, if different UEs perform the uplink data transmission on the same uplink time and frequency resource, because the n-DMRS field is set to a fixed state, and the uplink reference signal sequences of these UEs have a same cyclic shift value, different UEs in the semi-persistent scheduling cannot perform the data transmission on the same time and frequency resource, and therefore, the spectrum utilization efficiency is reduced.

Figure 2:
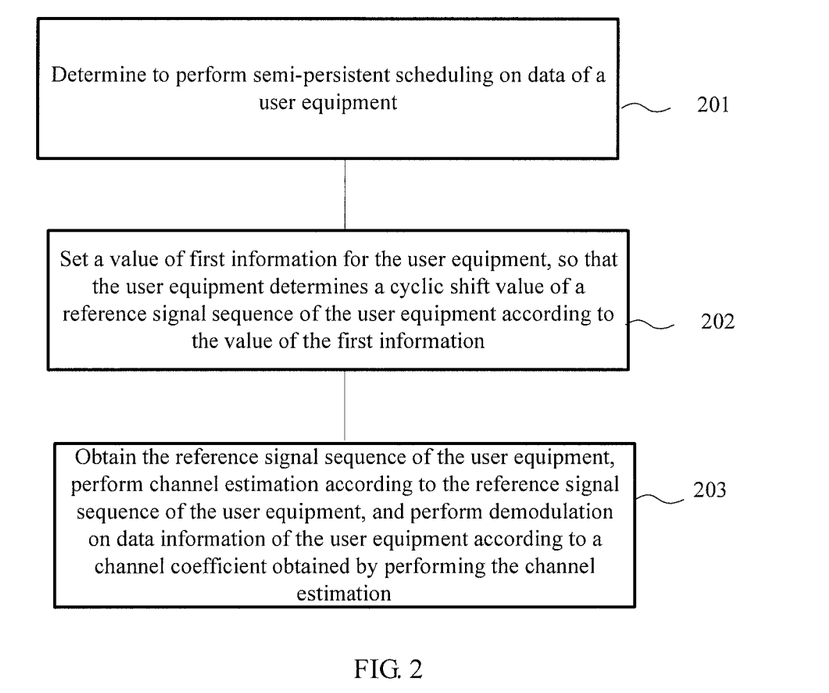
FIG. 2 is a flowchart of another data transmission method according to an embodiment of the present invention.

With reference to FIG. 2, a data transmission method according to an embodiment of the present invention is described in detail below. As shown in FIG. 2, the method may be as follows.

Step 201: Determine to perform semi-persistent scheduling on data of a user equipment.

Step 202: Set a value of first information for the user equipment, so that the user equipment determines a cyclic shift value of a reference signal sequence of the user equipment according to the value of the first information.

The first information may be a value of an n-DMRS.

The setting a value of first information for the user equipment may include:

sending radio resource control signaling to the user equipment, where the radio resource control signaling includes second information; and setting the value of the first information for the user equipment according to a mapping set between a value for the second information and the value of the first information. Specifically, in an existing LTE system, when data transmission is performed by adopting an uplink semi-persistent scheduling manner, a new field may be added in RRC (Radio resource control) signaling, for example, an m-DMRS, to indicate or determine a value of an n-DMRS field on a PDCCH for the UE. The m-DMRS may be the foregoing second information. Correspondence between a value of the m-DMRS and the value of the n-DMRS may be as shown in Table 1, Table 2, or Table 3. Table 1 shows correspondence between the value of the m-DMRS and the value of the n-DMRS when a length of an m-DMRS field is 1 bit. Table 2 shows correspondence between the value of the m-DMRS and the value of the n-DMRS when the length of the m-DMRS field is 2 bits. Table 3 shows correspondence between the value of the m-DMRS and the value of the n-DMRS when the length of the m-DMRS field is 3 bits.

Therefore, if different UEs perform data transmission on a same uplink time and frequency resource by adopting a semi-persistent scheduling manner, a base station may set different values of the n-DMRS for the foregoing different UEs by using the value of the m-DMRS, so that reference signal sequences of the foregoing different UEs have different cyclic shift values of the reference signals, which ensures orthogonality of the reference signal sequences of the foregoing UEs.

TABLE 1

| m-DMRS | n-DMRS |
| --- | --- |
| 0 | 000 |
| 1 | 001 |

TABLE 2

| m-DMRS | n-DMRS |
| --- | --- |
| 00 | 000 |
| 01 | 001 |
| 10 | 010 |
| 11 | 011 |

TABLE 3

| m-DMRS | n-DMRS |
| --- | --- |
| 000 | 000 |
| 001 | 001 |
| 010 | 010 |
| 011 | 011 |

TABLE 3-continued

| m-DMRS | n-DMRS |
|---|---|
| 100 | 100 |
| 101 | 101 |
| 110 | 110 |
| 111 | 111 |

The base station determines, according to the value that is of the n-DMRS and is determined through the m-DMRS, and a mapping rule of a PHICH (Physical Hybrid indicator channel, physical hybrid indicator channel), an index of the PHICH channel for the UE. The UE performs, according to the value that is of the n-DMRS and is determined through the m-DMRS, ACK/NACK detection on the determined PHICH channel.

According to the foregoing method, in the semi-persistent scheduling manner, if uplink data transmission blocks of different UEs occupy a same start PRB index, or multiple uplink data transmission blocks of a same UE occupy a same start PRB index, and a PHICH channel corresponding to an uplink data transmission block of the foregoing UE is determined on a same downlink carrier, a collision of the PHICH channel corresponding to the uplink data transmission block of the foregoing UE may be avoided.

The setting a value of first information for the user equipment may include: where the first information is determined by a three-bit cyclic shift indicator field of a demodulation reference signal on a physical downlink control channel, setting the value of the first information for the user equipment by setting one or two bits in the cyclic shift indicator field of the demodulation reference signal to a fixed value. Specifically, when the data transmission is performed by adopting the semi-persistent scheduling manner, the n-DMRS field on the PDCCH may be used to indicate the value of the n-DMRS for different UEs. That is, the base station may not set a 3-bit n-DMRS field on the PDCCH to a fixed state. Therefore, if different UEs perform the data transmission on the same uplink time and frequency resource, the base station may set different n-DMRS states for the foregoing UEs on the PDCCH, so that the reference signal sequences of the foregoing UEs have different cyclic shift values of the reference signals, which ensures orthogonality of the reference signal sequences of the foregoing UEs.

For example, a state of a first bit of the 3-bit n-DMRS field may not be fixed, and states of a second bit and a third bit are set to 0 fixedly. An n-DMRS field after the foregoing setting may indicate two values. A value 000 is used by one UE, and a value 100 is used by another UE. The base station indicates a cyclic shift value of an uplink reference signal sequence for the UE according to the value of the n-DMRS, and determines, according to the PHICH mapping rule in LTE, an index of the PHICH channel corresponding to the uplink data transmission block of the foregoing UE. The UE performs, according to an n-DMRS state, the ACK/NACK detection on the PHICH channel which is determined for it by the base station.

In an embodiment, states of a first bit and a second bit of the 3-bit n-DMRS field may not be fixed, and a state of a third bit is set to 0 fixedly. An n-DMRS field after the foregoing setting may indicate four values.

The setting a value of first information for the user equipment may include: setting the value of the first information for the user equipment by setting a padding bit on a physical downlink control channel and a mapping between a value of the padding bit and the value of the first information.

For example, in the LTE system, a load of a PDCCH for scheduling uplink data transmission needs to be smaller than a load of a PDCCH for scheduling downlink data transmission. To reduce the number of times that the UE detects the PDCCH, it is stipulated in the LTE system that the load of the PDCCH for scheduling the uplink data transmission should be equal to the load of the PDCCH for scheduling the downlink data transmission. Therefore, some padding bits (padding bits) need to be added on the PDCCH which is for scheduling the uplink data transmission, so that the load of the PDCCH for scheduling the uplink data transmission is equal to the load of the PDCCH for scheduling the downlink data transmission.

For example, the padding bits (padding bits) added on the PDCCH which is for scheduling the uplink data transmission may be used to determine the value of the n-DMRS for different UEs.

For example, when a length of the padding bits is 1 bit, a mapping between a value of the padding bits and the value of the n-DMRS is as shown in Table 4. Table 4 is obtained after replacing the m-DMRS field in Table 1 with the padding bits.

TABLE 4

| padding bits | n-DMRS |
|---|---|
| 0 | 000 |
| 1 | 001 |

Similarly, a mapping between the value of the padding bits and the value of the n-DMRS when the length of the padding bits is 2 or 3 bits may be obtained.

For example, the base station determines the index of the PHICH channel corresponding to the uplink data transmission block of the foregoing UE by using the value that is of the n-DMRS and is indicated by the padding bits and according to the PHICH mapping rule in the LTE; and the UE performs, according to the value of the n-DMRS field, the ACK/NACK detection on the PHICH which is determined for it by the base station.

The setting a value of first information for the user equipment may include:

in a single-user multi-codeword transmission mode, setting the value of the first information for the user equipment by setting a value of a field added on a physical downlink control channel in the single-user multi-codeword transmission mode relative to a physical downlink control channel in a single-user single-codeword transmission mode, and a mapping between the value of the added field and the value of the first information.

For example, in the LTE system, some new fields are added for a PDCCH for scheduling uplink single-user multi-codeword transmission relative to a PDCCH for scheduling single-codeword transmission, for example, a PMI (precoding matrix indicator) field, an n-DMRS field of codeword 2 or a differential field, and an RI (Rank indication) field. Therefore, if different UEs transmit data on the same time and frequency resource, a newly-added field on a PDCCH which is in a multi-codeword format and for semi-persistent scheduling, or part of bits in a newly-added field on a PDCCH which is in a multi-codeword format and for semi-persistent scheduling, or a combination of newly-added fields on a PDCCH which is in a multi-codeword format and for semi-persistent scheduling, or a redundancy state of a newly-added field on a PDCCH which is in a multi-codeword format and for semi-persistent scheduling may be used to indicate the value of the n-DMRS for the UE.

If the newly-added field (or the part of the bits in the newly-added field, or the combination of the newly-added fields, or the redundancy state of the newly-added field) is defined as a k-DMRS, for a mapping between a value of the k-DMRS and the value of the n-DMRS, reference may be made to a process of establishing the mapping between the value of the padding bits and the value of the n-DMRS field.

For example, the base station, according to the newly-added field on the PDCCH which is in the multi-codeword format, or the part of the bits in the newly-added field on the PDCCH which is in the multi-codeword format, or the combination of the newly-added fields on the PDCCH which is in the multi-codeword format, or the redundancy state of the newly-added field on the PDCCH which is in the multi-codeword format, indicates the value of the n-DMRS, determines the cyclic shift value of the uplink reference signal sequence for the UE, and determines, according to the PHICH mapping rule in the LTE, the index of the PHICH channel corresponding to the uplink data transmission block for the foregoing UE. According to the n-DMRS state, the UE performs the ACK/NACK detection on the PHICH that is determined for it by the base station.

The setting a value of first information for the user equipment may include: in a scenario of carrier aggregation, setting the value of the first information for the user equipment by setting a value of a carrier indicator field on a physical downlink control channel, and a mapping between the value of the carrier indicator field and the value of the first information. Specifically, in the LTE system, a carrier aggregation (carrier aggregation) technology is supported. In the LTE system, it is allowed that a PDCCH on a downlink carrier schedules a data resource on another downlink or uplink carrier by means of cross-carrier scheduling. Therefore, in a scenario of cross-carrier scheduling, a 3-bit carrier indicator field is added in a PDCCH structure. The carrier indicator field on the PDCCH is used to indicate an index of the downlink or uplink carrier that is scheduled.

For example, one or multiple bits in the CIF field on the PDCCH may be used to indicate the value of the n-DMRS for the UE. A mapping between one or multiple bits in the field and the value of the n-DMRS may be established. Specifically, reference may be made to Tables 1 and 2.

Alternatively, in a scenario of carrier aggregation, a redundancy value in different values which can be indicated by a carrier indicator field in the carrier indicator field on a physical downlink control channel, compared with values used for indicating different carriers in the carrier indicator field, is obtained; and the value of the first information is set for the user equipment by setting a mapping between the redundancy value and the value of the first information. Specifically, different values of the n-DMRS may be set for different UEs by using the redundancy state in the CIF field. For example, if a range of an index of an uplink carrier, where the uplink carrier may be scheduled by means of cross-carrier scheduling by a PDCCH which is for uplink semi-persistent scheduling and is of the UE, is A, B bits in the CIF field may be used to set the value of the n-DMRS for the UE, where:

$B = 3 - \mathrm{ceil}(\log 2(A))$; and

Ceil is a roundup function.

Table 1, 2, or 3 shows a mapping between a value of the B bits and the value of the n-DMRS. That is, the m-DMRS field in Table 1, 2, or 3 is replaced with a B-bit field. Alternatively, the value of the n-DMRS field on the PDCCH may not be set to a fixed value. The value of the n-DMRS is set for the UE by using the value of the n-DMRS field, and one or multiple bits in the CIF field on the PDCCH are set to fixed states to reduce a false alarm detection probability of the PDCCH.

Step 203: Obtain the reference signal sequence of the user equipment, perform channel estimation according to the reference signal sequence of the user equipment, and perform demodulation on data information of the user equipment according to a channel coefficient obtained by performing the channel estimation.

Figure 3:
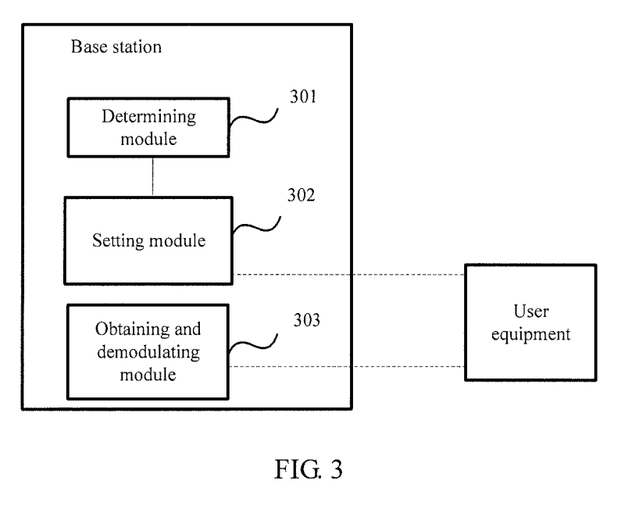
FIG. 3 is a schematic structural diagram of a base station according to an embodiment of the present invention.

With reference to FIG. 3, a base station according to an embodiment of the present invention is described. As shown in FIG. 3, the base station includes: a determining module 301, a setting module 302, and an obtaining and demodulating module 303.

The determining module 301 is configured to determine to perform semi-persistent scheduling on data of a user equipment.

The setting module 302 is configured to set a value of first information for the user equipment, so that the user equipment determines a cyclic shift value of a reference signal sequence of the user equipment according to the value of the first information.

The obtaining and demodulating module 303 is configured to obtain the reference signal sequence of the user equipment, perform channel estimation according to the reference signal sequence of the user equipment, and perform demodulation on data information of the user equipment according to a channel coefficient obtained by performing the channel estimation.

The setting module 302 includes a first setting unit, a second setting unit, a third setting unit, a fourth setting unit, or a fifth setting unit.

The first setting unit is configured to send radio resource control signaling to the user equipment, where the radio resource control signaling includes second information; and set the value of the first information for the user equipment according to a mapping between a value set for the second information and the value of the first information.

The second setting unit is configured to: if the first information is determined by a three-bit cyclic shift indicator field of a demodulation reference signal on a physical downlink control channel, set the value of the first information for the user equipment by setting one or two bits in the cyclic shift indicator field of the demodulation reference signal to a fixed value.

The third setting unit is configured to set the value of the first information for the user equipment by setting a padding bit on a physical downlink control channel and a mapping between a value of the padding bit and the value of the first information.

The fourth setting unit is configured to set, in a single-user multi-codeword transmission mode, the value of the first information for the user equipment by setting a value of a field added on a physical downlink control channel in the single-user multi-codeword transmission mode relative to a physical downlink control channel in a single-user single-codeword transmission mode, and a mapping between the value of the added field and the value of the first information.

The fifth setting unit is configured to: in a scenario of carrier aggregation, set the value of the first information for the user equipment by setting a value of a carrier indicator field on a physical downlink control channel, and a mapping between the value of the carrier indicator field and the value of the first information; or in a scenario of carrier aggregation, obtain a redundancy value of different values which can be indicated by a carrier indicator field in the carrier indicator field on a physical downlink control channel and are relative to values used for indicating different carriers in the carrier indicator field, and set the value of the first information for the user equipment by setting a mapping between the redundancy value and the value of the first information.

The base station further includes a second determining module.

The second determining module is configured to determine, according to the value of the first information and a mapping rule of a physical hybrid indicator channel, a channel index of a physical hybrid indicator channel corresponding to an uplink data transmission block of the user equipment for the user equipment.

Figure 4:
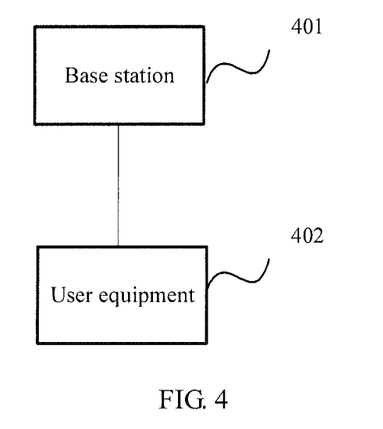
FIG. 4 is a schematic structural diagram of a communication system according to an embodiment of the present invention.

With reference to FIG. 4, a communication system according to an embodiment of the present invention is described. As shown in FIG. 4, the communication system includes: a base station 401, and a user equipment 402 that is connected to the base station 401 in a communicative manner.

The base station 401 is configured to determine to perform semi-persistent scheduling on data of the user equipment 402; set a value of first information for the user equipment 402, so that the user equipment 402 determines a cyclic shift value of a reference signal sequence of the user equipment 402 according to the value of the first information; and obtain the reference signal sequence of the user equipment 402, perform channel estimation according to the reference signal sequence of the user equipment 402, and perform demodulation on data information of the user equipment 402 according to a channel coefficient obtained by performing the channel estimation.

Those skilled in the art should understand that modules of an apparatus according to the embodiments of the present invention are divided by functions, and that in practice, a specific structure may be a split or a combination of the foregoing function modules.

In the foregoing embodiments of the present invention, the wording "receive" may be construed as actively obtaining information from another unit or receiving information sent by another unit.

The foregoing sequence numbers of the embodiments of the present invention are only for ease of description, but do not indicate the preference of the embodiments.

Solutions disclosed in content of the claims also fall within the protection scope of the embodiments of the present invention.

Persons of ordinary skill in the art may understand that all or part of the processes of the foregoing methods according to the embodiments may be implemented by a program instructing relevant hardware. The program may be stored in a computer readable storage medium.

The foregoing descriptions are only exemplary embodiments of the present invention, but not intended to limit the protection scope of the present invention. Any modification, equivalent replacement, or improvement made without departing from the spirit and principle of the present invention shall fall within the protection scope of the present invention.

What is claimed is:

1. A data transmission method, comprising:
   determining, by a base station, to perform semi-persistent scheduling on data of a user equipments;
   setting, by the base station, a value of first information for thea user equipment, the value of the first information utilizable by the user equipment to determine a cyclic shift value of a reference signal sequence of the user equipment, wherein the first information is determined by a three-bit cyclic shift indicator field of a demodulation reference signal on a physical downlink control channel (PDCCH), and the setting, by the base station,
   of the value of the first information for the user equipment comprises setting one bit or two bits of the three-bit cyclic shift indicator field to a fixed value; and
   obtaining, by the base station, the reference signal sequence of the user equipment, performing channel estimation according to the reference signal sequence of the user equipment, and performing demodulation on data information of the user equipment according to a channel coefficient obtained by the channel estimation.

2. The method according to claim 1, wherein the setting, by the base station, the value of the first information for the user equipment comprises:
   when the three bits of the three-bit cyclic shift indicator field of the demodulation reference signal on the PDCCH are set to a fixed value, setting, by the base station, the value of the first information for the user equipment according to a mapping set between a value of second information and the value of the first information, wherein the second information is comprised in radio resource control signaling sent by the base station.

3. The method according to claim 1, wherein the setting, by the base station, the value of the first information for the user equipment comprises:
   when the three bits of the three-bit cyclic shift indicator field of the demodulation reference signal on the PDCCH are set to a fixed value, setting, by the base station, the value of the first information for the user equipment according to a mapping between a set value of a padding bit of the PDCCH for scheduling uplink data transmission and the value of the first information, wherein a load of the PDCCH for scheduling uplink data transmission is equal to a load of a PDCCH for scheduling downlink data transmission.

4. The method according to claim 1, wherein the setting, by the base station, the value of the first information for the user equipment comprises:
   when the three bits of the three-bit cyclic shift indicator field of the demodulation reference signal on the PDCCH are set to a fixed value, in a single-user multi-codeword transmission mode, setting, by the base station, the value of the first information for the user equipment according to a mapping between a set value of a field and the value of the first information, wherein the field is an added field on the PDCCH in the single-user multi-codeword transmission mode compared with a PDCCH in a single-user single-codeword transmission mode.

5. The method according to claim 4, wherein the added field on the PDCCH in the single-user multi-codeword transmission mode compared with the PDCCH in the single-user single-codeword transmission mode comprises:
   a part of bits in the added field on the PDCCH in the single-user multi-codeword transmission mode compared with the PDCCH in the single-user single-codeword transmission mode; or
   a combination of added fields on the PDCCH in the single-user multi-codeword transmission mode compared with the PDCCH in the single-user single-codeword transmission mode; or
   a redundancy state of the added field on the PDCCH in the single-user multi-codeword transmission mode compared with the PDCCH in the single-user single-codeword transmission mode.

6. The method according to claim 1, wherein the setting, by the base station, the value of the first information for the user equipment comprises:

when the three bits of the three-bit cyclic shift indicator field of the demodulation reference signal on the PDCCH are set to a fixed value, in a scenario of carrier aggregation, setting, by the base station, the value of the first information for the user equipment according to a mapping between a set value of a carrier indicator field and the value of the first information, the value of the carrier indicator field set the PDCCH.

7. The method according to claim 1, wherein the setting, by the base station, the value of first information for the user equipment comprises:
when the three bits of the three-bit cyclic shift indicator field of the demodulation reference signal on the PDCCH are set to a fixed value, in a scenario of carrier aggregation, obtaining, by the base station, a redundancy value of different values which is able to be indicated by a carrier indicator field in the carrier indicator field on the PDCCH compared with values used for indicating different carriers in the carrier indicator field, and setting the value of the first information for the user equipment by setting a mapping between the redundancy value and the value of the first information.

8. The method according to claim 1, wherein after the user equipment determines the cyclic shift value of the reference signal sequence of the user equipment, the method further comprises:
determining, by the base station, according to the value of the first information and a mapping rule of a physical hybrid indicator channel, a channel index of the physical hybrid indicator channel corresponding to an uplink data transmission block of the user equipment for the user equipment.

9. The method according to claim 8, further comprising:
determining, by the user equipment, the channel index of the physical hybrid indicator channel corresponding to the uplink data transmission block of the user equipment according to the value of the first information and the mapping rule of the physical hybrid indicator channel; and
detecting, by the user equipment, on the physical hybrid indicator channel, whether data sent by the user equipment to the base station is correctly received by the base station.

10. A base station, comprising:
a non-transitory computer readable storage medium to store program(s), and
computer hardware configured to implement, including configured by the program(s) to implement:
a determining module, configured to determine to perform semi-persistent scheduling on data of user equipments;
a setting module, configured to set a value of first information for the user equipment, the value of the first information utilizable by the user equipment to determine a cyclic shift value of a reference signal sequence of the user equipment, wherein the first information is determined by a three-bit cyclic shift indicator field of a demodulation reference signal on a physical downlink control channel (PDCCH), and the setting, by the base station, of the value of the first information for the user equipment comprises setting one bit or two bits of the three-bit cyclic shift indicator field to a fixed value; and
an obtaining and demodulating module, configured to obtain the reference signal sequence of the user equipment, perform channel estimation according to the reference signal sequence of the user equipment, and perform demodulation on data information of the user equipment according to a channel coefficient obtained by the channel estimation.

11. The base station according to claim 10, wherein when the three bits of the three-bit cyclic shift indicator field of the demodulation reference signal on the PDCCH are set to a fixed value, the setting module comprises:
a second setting unit, configured to send second information, wherein the value of the first information for the user equipment is set according to a mapping set between a value for the second information and the value of the first information, wherein the second information is comprised in radio resource control signaling sent by the base station; or
a third setting unit, configured to set the value of the first information for the user equipment according to a mapping between a set value of a padding bit of the PDCCH for scheduling uplink data transmission and the value of the first information, wherein a load of the PDCCH for scheduling uplink data transmission is equal to a load of a PDCCH for scheduling downlink data transmission; or
a fourth setting unit, configured to set, in a single-user multi-codeword transmission mode, the value of the first information for the user equipment according to a mapping between a set value of a field and the value of the first information, wherein the field is an added field on the PDCCH in the single-user multi-codeword transmission mode compared with a PDCCH in a single-user single-codeword transmission mode; or
a fifth setting unit, configured to:
in a scenario of carrier aggregation, set the value of the first information for the user equipment according to a mapping between a set value of a carrier indicator field and the value of the first information, the value of the carrier indicator field set on the PDCCH; or
in a scenario of carrier aggregation, obtain a redundancy value of different values which is able to be indicated by a carrier indicator field in the carrier indicator field on the PDCCH compared with values used for indicating different carriers in the carrier indicator field, and set the value of the first information for the user equipment by setting a mapping between the redundancy value and the value of the first information.

12. The base station according to claim 10, further comprising: a second determining module, wherein:
the second determining module is configured to determine, according to the value of the first information and a mapping rule of a physical hybrid indicator channel, a channel index of the physical hybrid indicator channel corresponding to an uplink data transmission block of the user equipment for the user equipment.

* * * * *

UNITED STATES PATENT AND TRADEMARK OFFICE
CERTIFICATE OF CORRECTION

PATENT NO. : 8,897,164 B2  
APPLICATION NO. : 13/593958  
DATED : November 25, 2014  
INVENTOR(S) : Zheng Yu et al.

Page 1 of 1

It is certified that error appears in the above-identified patent and that said Letters Patent is hereby corrected as shown below:

In the Claims

Claim 1, Column 9, Line 61:

Delete "thea" and insert --a--, therefor

Signed and Sealed this
Second Day of June, 2015

Michelle K. Lee
*Director of the United States Patent and Trademark Office*